United States Patent [11] 3,590,492

[72] Inventor Lowell C. Johnson, West Granby, Conn.
[21] Appl. No. 841,406
[22] Filed July 14, 1969
[45] Patented July 6, 1971
[73] Assignee The Johnson Gage Company, Bloomfield, Conn.

[54] SCREW THREAD GAGE WITH SEGMENTAL AND ENVELOPE GAGING MEANS
10 Claims, 6 Drawing Figs.

[52] U.S. Cl. ............................................... 33/199, 33/178
[51] Int. Cl. ............................................... G01b 3/14
[50] Field of Search ................................... 33/199 B, 178

[56] References Cited
UNITED STATES PATENTS
3,388,476  6/1968  Johnson ............... 33/178
3,477,136  11/1969 Johnson ............... 33/178

Primary Examiner—William D. Martin, Jr.
Attorney—John M. Montstream

ABSTRACT: The disclosure is directed to a screw thread gage having a plurality of segmental gaging means each with a gaging element having an arcuate gaging surface of substantial circumferential extent. The gaging means are radially expandable and contractable for engaging and gaging the test thread, as well as centering the gage frame at the axis of the screw thread. Between segmental gaging means there is an envelope gaging means which is radially expandable and contractable for contact with the test thread and the gaging position of which is shown by an indicator. The segmental gaging elements of the gage ride on any high points of the test thread and gives no indication as to the form of the circular envelope of the test thread. The envelop gaging means has a gaging element with a small circumferential contact with the test thread so that when the test thread or the gage is rotated one with respect to the other, the envelope gaging means will indicate any irregularities such as lobes in the test thread and the depth thereof.

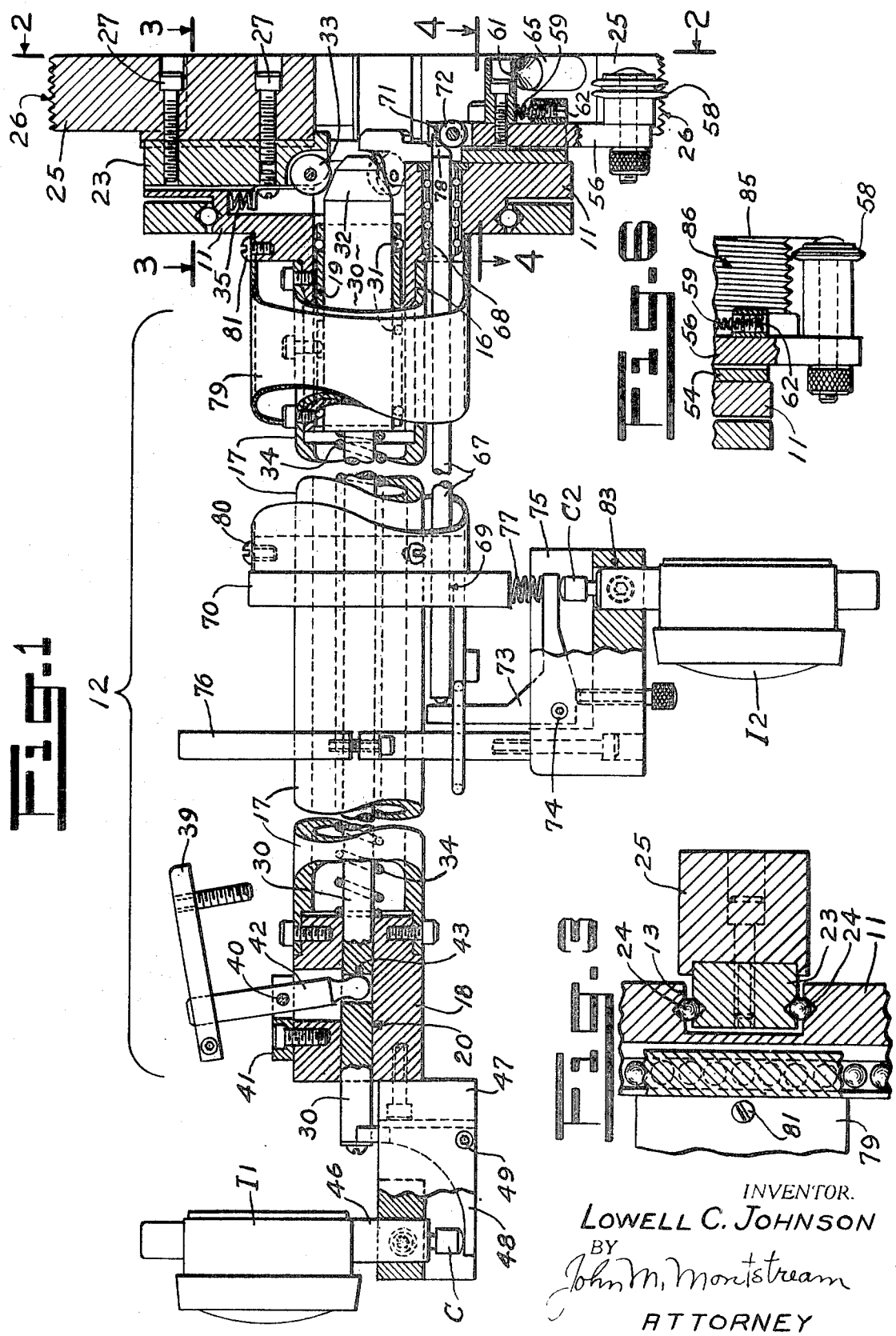

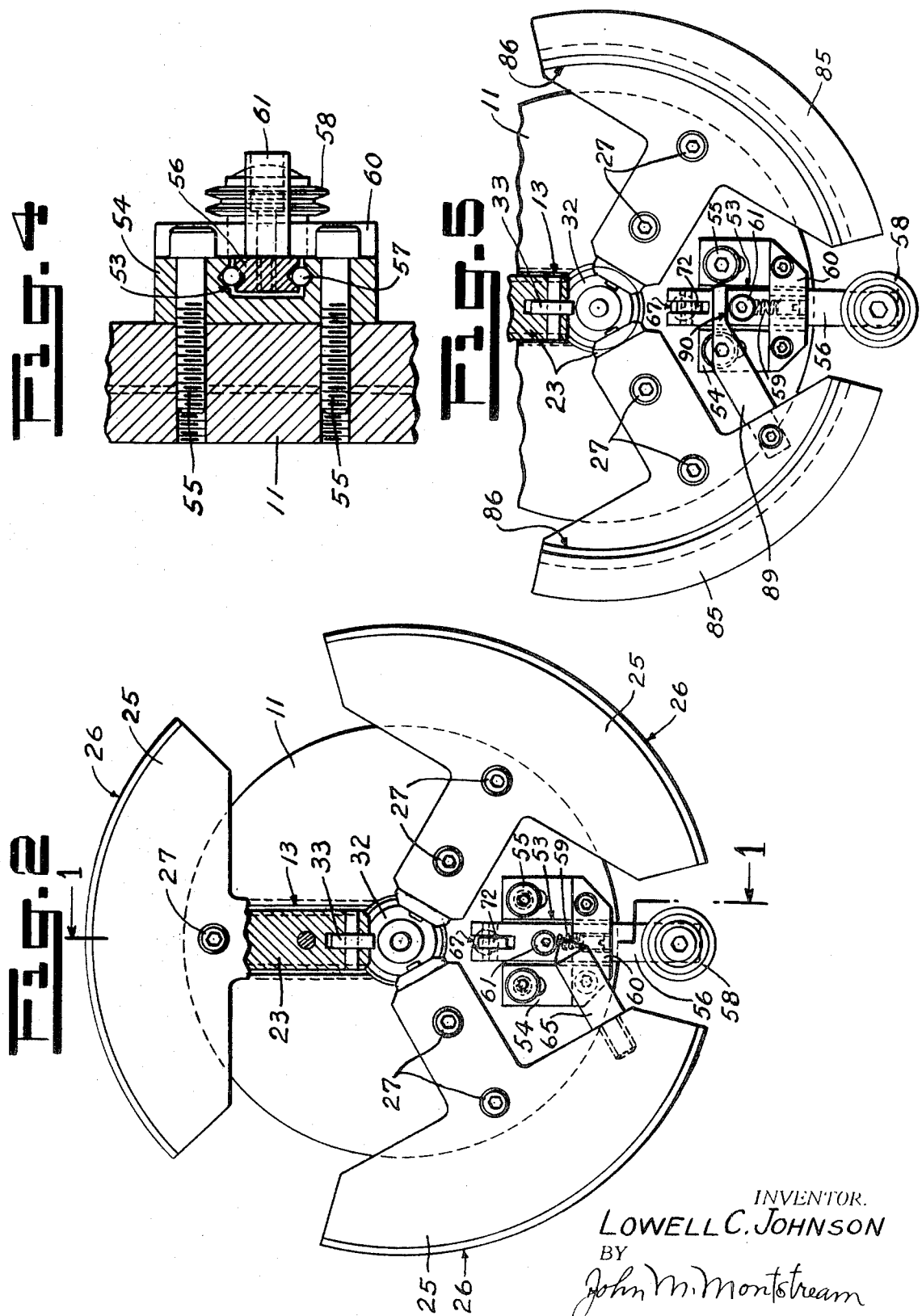

SCREW THREAD GAGE WITH SEGMENTAL AND ENVELOPE GAGING MEANS

In gaging a screw thread with a comparator gage, it is common practice to use gaging means having segmental gaging elements angularly spaced from each other and which elements have substantial circumferential gaging surfaces so that the plurality of gaging elements together engage a large part of the circumference of the test thread. This gage will test as to the overall assemble-ability of the test thread on its mating thread, which is the first requirement of a screw thread. Although this gage indicates the assemble-ability of the test thread and whether or not its overall dimension is within the minimum and maximum allowable tolerances, this gage does not tell the complete story as to the form or circular accuracy of the thread and hence its ability to withstand the axial pressure put thereon. If the peripheral envelope of the test thread has one or more axially extending lobes around the envelope and of substantial depth, the test thread will be engaged by the mating thread only at the high points in the thread which would reduce the holding power of the thread and would substantially reduce its holding power if the lobes were of significant depth and few in number.

The gage to be described provides an envelope gaging means combined with a gage which has segmental gaging elements so that when the test thread or the gage is turned one with respect to the other, the envelope gaging means follows the radial irregularities in the thread, such as lobes, and indicates their number and depth.

It is an object of the invention to construct a screw thread gage having a plurality of segmental gaging elements and to provide an envelope gaging means located between two of the elements or segments and projecting between the adjacent ends of the two segments to engage the test thread therebetween whereby the segmental gaging elements indicate the over all assemble-ability of the test thread with respect to its mating thread and whether or not the thread is within the allowable tolerances as to diameter but also gives a test as to the shape or circularity of the envelope of the test thread as well as the depth of any lobes or other irregularity in the thread envelope.

Another object of the invention is as in the preceeding paragraph and to connect the envelope gaging means with the segmental gaging means so that when the latter is contracted and expanded, or vice versa, the envelope gaging means is contracted or expanded therewith when axially positioning the gage with respect to the test thread and gaging contact with the test thread.

Another objects of the invention will be more apparent from the following description when taken in connection with the accompanying drawings illustrating a preferred embodiment thereof in which:

FIG. 1 is a longitudinal section taken on line 1-1 of FIG. 2 through a gage having convex segmental gaging elements and an envelope gaging means;

FIG. 2 is an end view of the gage of FIG. 1 with a part in section;

FIG. 3 is a cross section through a guideway for mounting the segmental gaging means and a part of the gaging means;

FIG. 4 is a cross section taken on line 4-4 of FIG. 2, showing the guideway for mounting the envelope gaging means;

FIG. 5 is an end view of the gage of FIG. 1 having segmental gaging elements with a concave gaging surface for gaging an external screw thread, and FIG. 6 is a partial view of the envelope gaging means taken on line 6-6 of FIG. 5.

The basic structure of the gage illustration is described in detail in patent application SN 607,329, filed Jan. 4, 1967. Briefly the gage includes a frame comprising a plate 11 and a stem 12. The plate has a plurality of angularly spaced, radially extending main guideways 13 carried thereby and angularly spaced from each other, three being particularly shown, and being provided preferably by grooves in the plate. The stem of the frame, as illustrated, includes basically a body member 16 attached to the plate, a tubular member 17 and an end member 18, all suitably secured together. The body and plate members have a central bore 19 therethrough and the end member also has a central bore 20 therethrough.

A segmental gaging means is mounted in each main guideway which preferably includes a slide 23 suitably mounted for radial movement in the guideway such as on ball bearings 24. Each slide carries a gaging element 25 which is of the segmental type, that is, it has a substantial arcuate gaging surface 26, shown as convex for an internal test thread T. The gaging surface carries screw thread means corresponding with that of a part of the mating thread of the test thread. The plurality of segmental gaging elements together engage a substantial portion of the circumference of the test thread. Each segmental gaging means includes its slide and the segmental gaging element which is secured thereto by screws 27.

Segmental operating means is provided to contract and expand the segmental gaging means. The operating means particularly shown includes an operating member 30 movable axially in the bores of the stem or frame, and being mounted on ball bearings 31 in the bore of the body member. This operating member has a conical surface 32 at one end which engages a contacting roller 33 carried by each slide or segmental gaging means. A spring 34 engages and propels the operating member to the right for an internal thread, as shown in FIG. 1. When the operating member is propelled to the left contracting spring means 35 for each segmental gaging means propels its gaging means radially inwardly so that so that it can be passed axially over the test thread and keeps each roller in contact with the cone 32. For an internal thread gage the spring means 34 has sufficient strength to propel the operating member to the right and propel the gaging means radially outwardly against the pressure of the three combined contracting spring means so that the latter are overcome by the operating member. The operating member is moved to the left so that for a gage for an internal thread, the segmental gaging means may contract.

An operating lever 39 is pivotally mounted on a pivot pin 40 carried by a lever bracket 41 which is secured to the end member and forming a part of the frame. One arm 42 of this lever is received in a slot 43 in the operating member and depression of the other arm or clockwise rotation propels the latter to the left to contract the gaging elements. When the handle is released the operating member is propelled to the right, FIG. 1, by the spring means 34 to expand all three gaging elements an equal amount into contact with the test thread.

The stem of the frame is provided with an indicator mounting means 46, shown particularly as carried by an indicator bracket 47 which is secured to the end member 18 of the frame. This indicator bracket carries indicator mounting means 46 shown as a socket or bore therein to receive the stem of the indicator I1 which has a contactor C1. A suitable indicator connection is provided between the segmental gaging means and a point adjacent to the indicator mounting means. Preferably the operating member 30 is a part of this connection, the position of which is transferred to the indicator contactor through the indicator lever 48 pivotally mounted on a pin 49. One arm of this lever is engaged by the operating member 30, and the other arm is at a point adjacent to the indicator mounting means or socket so that it will engage the contactor C1 of an indicator I1 therein. Since the position of the operating member has a position corresponding with the position of the segmental gaging means in gaging position, its position provides a take off point for measurement, or an indication, of the position of the gaging elements and the overall diameter of the test thread and as to whether or not it is within the allowable tolerances.

The frame plate also carries a radially extending envelope guideway 53 located between two adjacent main guideways for the segmental gaging means. This guideway is shown as on a separate envelope guideway member 54 which is secured to the frame by screws 55 and having a radial groove therein, FIG. 1, forming the guideway. The envelope guideway has an envelope slide 56 mounted therein for radial movement, such as on ball bearings 57. A gaging element 58 is carried by this slide which gaging element is shown as a roll which may have either a cone or a V thread gaging ridge, the latter form being shown. The roll preferably is rotatably mounted on a stud carried by the envelope slide in known manner. The envelope gaging element need not be a roll but should be a gaging element having a short circumferential, line or point contact with the test thread so that it will be responsive to any radial variations in the envelope from a true circle or cylinder, such as depth and circumferential extent of lobes of the test thread. An envelope gaging spring 59 is located between a crossbar 60 forming a part of the envelope guideway member and an envelope pin 61 carried by the envelope slide. The pressure of this spring can be adjusted by a screw 62.

Envelope operating means is provided to contract and expand the envelope gaging means radially. In order to assure that both the segmental gaging means and the envelope gaging means function together, the envelope operating means has a connection between an adjacent segmental gaging means and the envelope gaging means so that when the segmental gaging means is projected away from the test thread, the envelope gaging means is moved in the same direction. The connection particularly shown includes the projecting slide pin 61 on the envelope slide which is engaged by one of the segmental gaging elements so that when the latter is contracted for an internal thread, the envelope gaging means is contracted therewith. The connection with an adjacent segmental gaging element preferably is by an operating pin 65 carried by an adjacent segment which engages the slide pin. There is sufficient clearance, about twenty-thousandths of an inch, between the two pins with the gaging elements so that when gaging contacting the test thread, the envelope gaging means has sufficient freedom of radial movement to engage and move radially with the envelope of the test thread and without interference from the segmental gaging elements.

The envelope operating means also includes means to move the envelope gaging means into contact with the test thread. This means includes a push rod 67 slidably mounted on the frame, such as a ball bearing 68 provided in a hole through the plate of the frame, and a ball bearings 69 in a hole in a push rod bracket 70 which is received on the stem of the frame. This bracket is secured in position by being secured to a sleeve 79 by screws 80 and the sleeve is secured on the frame or plate by screws 81. This push rod has an angular end 71 extending at 45 degrees which end engages the envelope slide or particularly a roller 72 carried thereby. The other end of this push rod engages one arm of an envelope indicator lever 73 which is pivotally mounted on a pin 74 carried by an envelope indicator bracket. This bracket is secured to a mounting ring which is clamped to a stem or tubular member 17. An envelope operating spring 75 propels the other arm of lever 73 in a direction to propel the push rod and its angular end to the right, FIG. 1, and thereby propels the envelope gaging means radially outwardly into contact with the test thread. The envelope operating spring 75 is strong enough to overcome the inward pressure of the spring 59 which propels the envelope gaging means radially inwardly in order that the slide roll 72 may be kept in contact with the angular surface 71 of the push rod. The push rod is suitably prevented from turning, such as by flat sides 78 on the push rod at the angular end engaging the sides of the slot in the envelope slide in which the roller 72 is mounted.

The slide of the envelope gaging means is operatively connected with an indicator I2 which is carried in an indicator mounting means 83, shown as a socket or bore in the envelope indicator bracket 75. The stem of the indicator I2 is received and secured in this socket, so that the indicator contactor C2 is engaged by the envelope indicator lever 73. This connection conveniently uses the push rod and the indicator lever 73, the other arm of which engages the contactor C2 of the indicator I2. It will be noted therefore that the envelope operating means and the envelope indicator connection is essentially one structure having these two functions.

FIGS. 5 and 6 illustrate the combination in connection with gaging elements adapted to test the accuracy of an external screw thread and the thread envelope. The changes in structure for this use will be described with the same parts bearing the same number. To each of the slides 23 there is attached a segmental gaging element 85 having a concave arcuate gaging surface 86 which engages a substantial portion of the arc of an external test thread. The gaging thread ridges of each gaging surface are portions of a mating thread of the external test thread to be gaged. The spring means or springs which press each gaging element inwardly has power or inwardly directed pressure which is greater than the spring means 34 projecting the operating member 30 to the right to overcome the same so that the gaging elements are manually pressed outwardly by the operating means and handle 39 so that the gaging elements will axially clear the test thread and upon release of the handle the three springs 59 project the segments inwardly into contact with the test thread. For this construction the handle 39 preferably is turned around on the arm 42 so that counterclockwise rotation of the handle will project the operating member 30 to the right, FIG. 1, and expand the gaging elements for insertion on the thread. When the handle is released the springs 59 press each gaging element inwardly to engage the external thread and projects the operating member to the left so that the indicator I1 indicates the position of the operating member and the segmental gaging elements. The contact between the operating member 30 and the indicator lever 48 is made active in the opposite direction from that for an internal thread.

Envelope gaging means is provided which is essentially the same as that shown in FIG. 2 but with the spring 59, which projects the gaging roll inwardly, having a greater strength than the spring 77 acting on the envelope indicator lever 73 so that when the gaging roll is pressed inwardly into contact with the external test thread, the push rod 67 is projected to the left and the position of the gaging roll when in contact with the test part is read from the envelope gaging means indicator I2.

In order that the gaging roll expand when the gage is axially positioned over the test thread with the expansion of the segmental gaging elements, an operating pin 89 is secured to an adjacent segmental gaging element which pin carries a surface 90 which is adjacent to the envelope pin 61. When the gaging elements are expanded for axial insertion on the test thread, the surface 90 engages the envelope pin to move the envelope gaging means outwardly therewith. There is enough clearance of about 20 thousandths between this surface and the envelope pin when the gaging elements and the gaging roll are in contact with the test thread so that the envelope gaging means has complete freedom for radial movement within a normal thread variation range during the gaging of the envelope of the test thread. The test thread is rotated within the gaging elements or the gage is rotated on the test thread and the indicator I2 for the envelope gaging means is watched to note its movement. The number of lobes, if any, in the circumference can be determined by one relative rotation and their depth as well as any other pecularity in the thread by watching the envelope gaging means indicator.

This invention is presented to fill a need for improvements in a Screw Thread Gaging Means with Segmental and Envelope Gaging Means. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

I claim:

1. A screw thread gage for gaging a test thread and adapted to carry a first and a second indicator each with a contactor comprising a main frame having an axis, a plurality of radially extending guideways carried by the main frame and angularly spaced from each other, segemental gaging means mounted for radial movement in each guideway and having a gaging element with an arcuate gaging surface of substantial circumferential extent, screw thread means on each arcuate surface corresponding with the test thread, the adjacent segmental gaging elements being spaced from each other, operating means carried by the main frame and connected with the segmental gaging means to move the same radially including an operating member, first indicator mounting means carried by the main frame to receive a first indicator, an indicator connection between a segmental gaging means and a point adjacent to the first indicator mounting means to engage the contactor of the first indicator to be received therein and responsive to the position of the segmental gaging means in gaging position, an envelope guideway carried by the main frame extending radially and located between two of the main guideways, envelope gaging means mounted for radial movement in the envelope guideway and having a gaging element providing small circumferential contact with the test thread, a second indicator mounting means carried by the main frame, an indicator connection between the envelope gaging means and a point adjacent to the second indicator mounting means to engage the indicator contactor of the second indicator mounted therein and responsive to the position of the envelope gaging means in gaging position, and envelope operating means connected with the envelope gaging means to move the same radially.

2. A screw thread gage as in claim 1 in which the indicator connection between a segmental gaging means and the first indicator mounting means includes the operating member.

3. A screw thread gage as in claim 1 in which the envelope guideway is a separate guideway which is secured to the main frame.

4. A screw thread gage as in claim 1 in which the envelope operating means includes an operating connection between a segmental gaging means and the envelope gaging means to operate the latter in one direction with the operating connection being spaced from the envelope gaging means when in gaging position, and spring means to operate the envelope gaging means in the other direction.

5. A screw thread gage as in claim 4 in which the operating connection between a segmental gaging means and the envelope gaging means includes a pin carried by a segmental gaging means which engages the envelope gaging means when the segmental gaging means is moved in a direction for axial insertion of the gage upon a test thread.

6. A screw thread as in claim 1 in which the envelope operating means includes a push rod mounted on the main frame for axial movement and connected with the envelope gaging means, envelope spring means connected with the envelope gaging means to contract the same, expanding spring means for the envelope gaging means connected with the push rod to expand the envelope gaging means, and one of the contracting spring means and expanding spring means having a strength to overcome the other.

7. A screw thread gage as in claim 6 in which the push rod forms a part of the connection to a point adjacent to the second indicator mounting means.

8. A screw thread gage as in claim 7 in which the indicator connection for the envelope gaging means includes an indicator lever engaging the push rod, and the expanding spring means for the envelope gaging means engages the indicator lever.

9. A screw thread gage as in claim 4 in which the arcuate gaging surface of the segmental gaging means is convex, the operating member being mounted on the frame for axial movement, expanding spring means connected with operating member to project the same axially in a direction to radially expand the segmental gaging means, manual means connected with the operating member to move the same in the opposite direction, contracting spring means connected with the segmental gaging means to contract the same, and the expanding spring means having the strength to overcome the contracting spring means.

10. A screw thread gage as in claim 4 in which the arcuate gaging surface of the segmental gaging means is concave, the operating member being mounted on the frame for axial movement, expanding spring means connected with the operating member to project the same axially in a direction to radially expand the segmental gaging means, manual means connected with the operating member to move the same in the same direction, contracting spring means connected with the segmental gaging means to contract the same, and the contracting spring means having a strength to overcome the expanding spring means.